United States Patent
Suzuki

(12) 
(10) Patent No.: US 6,262,882 B1
(45) Date of Patent: Jul. 17, 2001

(54) SMALL THICKNESS LAP-TOP COMPUTER HAVING PERIPHERAL KEYS OF REDUCED HEIGHT

(75) Inventor: Hiroshi Suzuki, Yonezawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/302,452

(22) Filed: Apr. 30, 1999

(30) Foreign Application Priority Data

May 1, 1998 (JP) .................................................. 10-121938

(51) Int. Cl.$^7$ .............................. G06F 1/16; H05K 5/03; B41J 5/10
(52) U.S. Cl. ............................................ 361/680; 400/488
(58) Field of Search ..................................... 361/679, 680, 361/683, 72 S; 400/488, 682, 691

(56) References Cited

U.S. PATENT DOCUMENTS

| | | | |
|---|---|---|---|
| 5,660,488 | * 8/1997 | Miller | 400/486 |
| 5,697,718 | * 12/1997 | Erler et al. | 400/714 |
| 5,768,093 | * 6/1998 | Howell et al. | 361/680 |
| 5,788,386 | * 8/1998 | Hayashi et al. | 400/489 |

FOREIGN PATENT DOCUMENTS

| | | |
|---|---|---|
| 61-12148 | 1/1986 | (JP) . |
| 2-32140 | 2/1990 | (JP) . |
| 4-95113 | 3/1992 | (JP) . |
| 4-101131 | 9/1992 | (JP) . |
| 5-119884 | 5/1993 | (JP) . |
| 5-241705 | 9/1993 | (JP) . |
| 5-298000 | 11/1993 | (JP) . |
| 9325841 | 12/1997 | (JP) . |

* cited by examiner

Primary Examiner—Lynn D. Feild
(74) Attorney, Agent, or Firm—Foley & Lardner

(57) ABSTRACT

A lap-top computer includes a computer body having a key board thereon and a top cover coupled to the computer body with a hinge and having a LCD unit thereon. A single row of key switches on each side of the key board has a lower top than other key switches in a normal position. The lower top of the key switch enables the top cover to be closed to the computer body without contacting the top cover with the top of the key switch, thereby reducing the overall thickness of the lap-top computer.

5 Claims, 2 Drawing Sheets

SMALL THICKNESS LAP-TOP COMPUTER HAVING PERIPHERAL KEYS OF REDUCED HEIGHT

BACKGROUND OF THE INVENTION (a) Field of the Invention

The present invention relates to a small thickness lap-top computer and, more particularly, to a lap-top computer having a reduced thickness by reducing the height of the key switches.

(b) Description of the Related Art

Small-size data processing devices, such as lap-top personal computers including a note type computer and a sub-note type computer and word processors, have become smaller and smaller in the horizontal size thereof as well in the vertical size. In this text, these data processing devices are generically called lap-top computers. A lap-top computer generally has a computer body and a top cover mounting thereon a display unit and attached to the computer body with a hinge for selecting between an open state and a closed state of the top cover.

A user opens the top cover, adjusts the angle of the top cover with respect to the computer body for observing the display unit, then operates to press the key switches on the key-board. The user finally closes the top cover after the operation of the lap-top computer for protection of the key board and the display unit. The top cover generally has a peripheral stripe protrusion extending along the outer periphery of the display unit and protruding therefrom by an amount corresponding to the thickness of the key board including the key switches. When the top cover is closed to the computer body, the protrusion contacts with the outer periphery of the computer body with the key switches on the key board being received in the space formed by the top cover and the computer body and defined by the inner periphery of the peripheral protrusion.

There is a strong demand that the lap-top computer be of a smaller size and a lower weight. It may be considered that the size of the computer body should be reduced together with the key board. This is in fact not practical, however, because the smaller key board having smaller key switches or a smaller space therebetween is difficult to operate. Alternatively, it may be considered that the amount of protrusion of key switches should be reduced by reducing the stroke of the key switches to thereby reduce the overall thickness of the lap-top computer. This is not practical either, because the smaller stroke impairs the feeling of the operation of the key switches. Further, it may be considered that the size of the top cover should be reduced; however, the smaller top cover reduces the size of the display unit, which impairs the observableness of the display unit by the user. After all, it is preferable that the smaller size and the lower weight be achieved by reducing the thickness of the top cover together with the display unit.

Patent Publication JP-A-5-119884 describes a lap-top computer wherein the smaller size and the lower weight of the lap-top computer are achieved while maintaining the stroke of the key switches. In the lap-top computer, each key switch has a key cylinder and a piston driven by compressed air to urge the key switch. The compressed air is supplied from a compressor which operates during an operational mode of the lap-top computer to urge the key switch upward, and stops operation during an idle mode of the lap-top computer to allow the key switches to stay at the bottom for reduction of the amount of protrusion. Thus, the lap-top computer has a smaller height of the peripheral protrusion and yet an enough space for the key switches without contact of the key switches with the surface of the display unit, which is desirable, thereby achieving a smaller size and a lower weight of the lap-top computer.

The lap-top computer described in the publication has a complicated configuration including the compressor, an air chamber for communicating each key cylinder with the compressor, and a valve assembly for switching the compressed air. Thus, the described lap-top computer is expensive and is more likely to suffer from a malfunction due to the provision of the compressor system.

It may be considered that a configuration, wherein the surface of the display unit urges the key switches toward the bottom when the top cover is closed, reduces the overall thickness of the lap-top computer. However, the reactive force of the key switches may generate a warp or deformation of the surface of the display unit, which is undesirable.

SUMMARY OF THE INVENTION

It is an object of the present invention to provide a lap-top computer having a reduced thickness substantially without increasing the number of constituent elements of the lap-top computer or without deformation of the surface of the display unit.

The present invention provides a lap-top computer including a computer body having thereon a key board including a plurality of key switches, and a top cover coupled to the computer body with a hinge, the top cover having a display unit and a peripheral protrusion adjacent to the display unit, the plurality of key switches including first key switches disposed in a central area of the key board and second key switches disposed in a peripheral area of the key board corresponding to at least a portion of the peripheral protrusion, the second key switches having a lower top than the first key switches in a normal position.

The above and other objects, features and advantages of the present invention will be more apparent from the following description, referring to the accompanying drawings.

PREFERRED EMBODIMENT OF THE INVENTION

Now, the present invention is more specifically described with reference to accompanying drawings.

Figure 1:
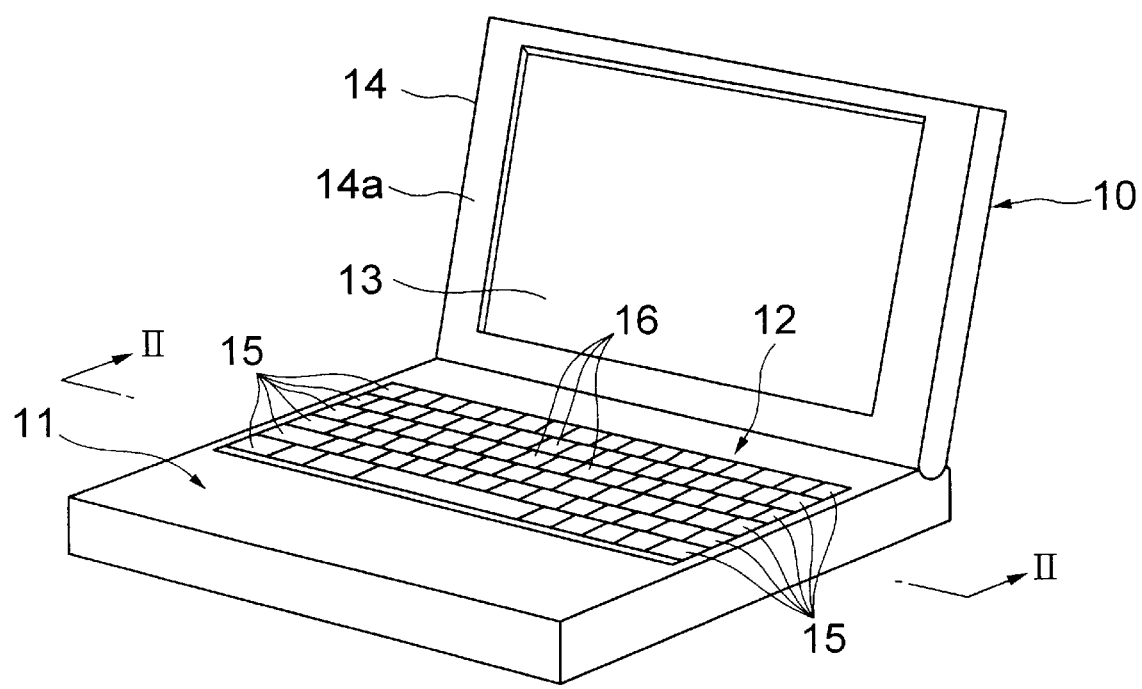
FIG. 1 is a perspective view of a lap-top computer according to an embodiment of the present invention.

Referring to FIG. 1, a lap-top computer according to an embodiment of the present invention includes a computer body 11 having a key board 12 thereon, and a top cover 10 coupled to the computer body 11 with a hinge. The top cover 10 has thereon an LCD (liquid crystal display) unit 13 and a peripheral frame portion 14 that surrounds the LCD unit 13 and protrudes from the surface of the LCD unit 13 by a small amount. The key board 12 includes a plurality of first key switches 16 disposed in a central area of the key board 12, and a plurality of second key switches 15 arranged in a single row in the vicinity of each peripheral side of the key board 12. The first key switches 16 include numeric key switches and alphabetic key switches used frequently by the user, whereas the second key switches 15 include other key switches less frequently used by the user.

Figure 2:
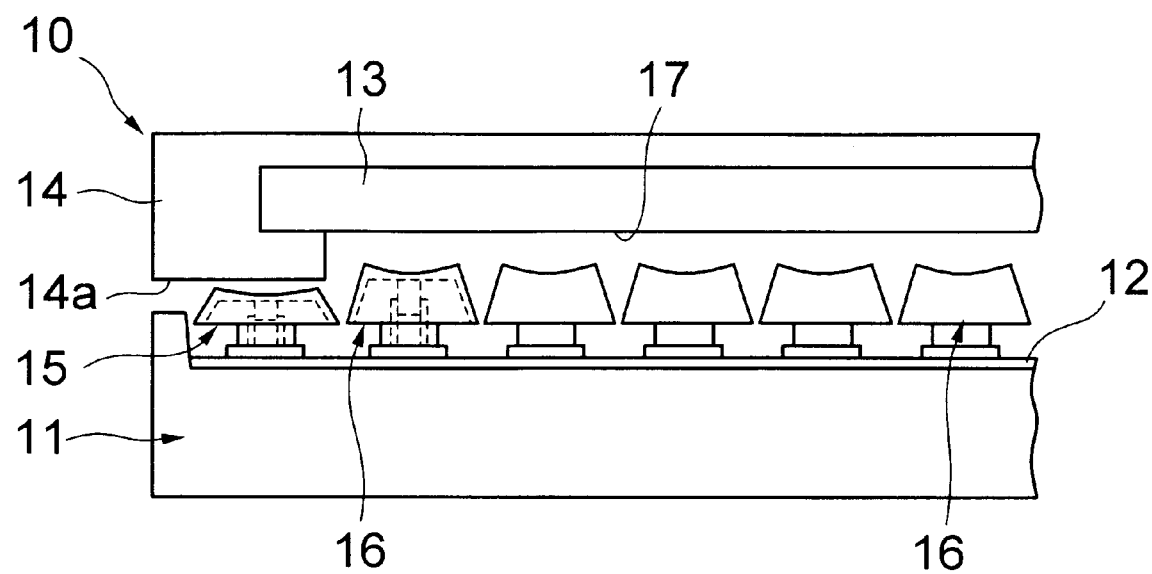
FIG. 2 is a partial cross-sectional view of the lap-top computer of FIG. 1 along line II—II of FIG. 1 with the top cover closed to the computer body.

Referring to FIG. 2, showing a partial cross-section taken along line II—II in FIG. 1 with the top over 10 close to the computer body 11, each of the second key switches 15 has a lower top compared to the first key switches 16 in the normal position thereof, namely, the position where the key switches are not depressed. The second key switches 15 oppose the front surface 14a of the peripheral protrusion 14 of the top cover 10 in a spaced relationship therewith, whereas the first key switches 16 oppose the surface of the LCD unit 13 in a spaced relationship therewith. That is, the key switches 15 and 16 are received in the space 17 formed between the computer body 11 and the top cover 10 in the normal position of the key switches 15 and 16 when the top cover 10 is closed toward the computer body 11.

Figure 3:
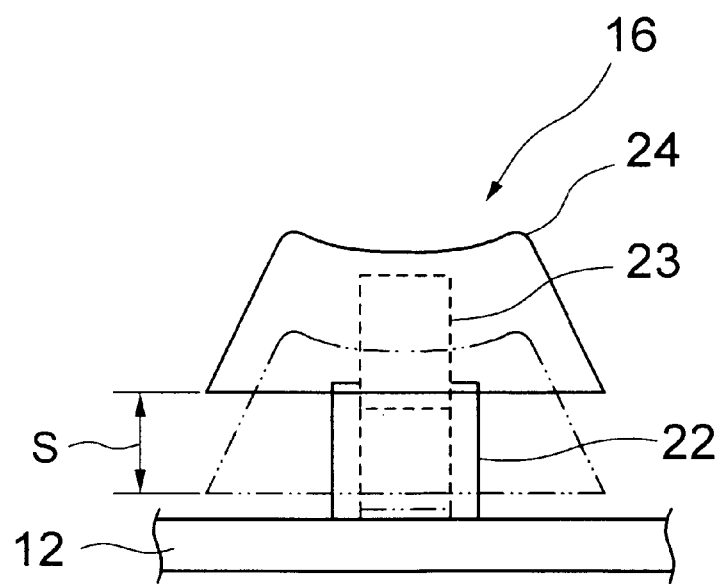
FIG. 3 is an enlarged view of one of the key switches shown in FIG. 2.

Referring to FIG. 3 showing the detail of a key switch 16, the key board 12 has thereon a key cylinder 22 for each of the key switches 15 and 16. The key switch 16 has a key piston 23 slidably received in the key cylinder 22 of the key board 12, and a key top fixed on top of the key piston 23 for receiving a thrust operation from the user. The key top 24 is depressed by the user by a stroke "S" shown in the figure. The second key switch 15 has a configuration similar to the configuration of the first key switch 16 except for the thickness of the key top 24, which is smaller than the thickness of the key top 24 of the first key switch 16, as will be understood from FIG. 2. The stroke "S" of the second key switches 15 is equal to the stroke "S" of the first key switches 16.

In the lap-top computer of the present embodiment, the configuration of the second key switches 15 each having a key top of a smaller thickness enables the top cover 10 to be closed to the computer body 11 such that the front surface 14a of the peripheral protrusion 14 of the top cover 11 does not contact with the key top 24 of the second key switches 15 and such that the computer body 11 and the top cover 10 receives therebetween the first key switches 16 within the space 17. Thus, the present embodiment provides a smaller overall thickness for the lap-top computer without using a complicated structure.

In the above embodiment, the user has an excellent feeling for the key operation due to the equal stroke between the first key switch 16 and the second key switch 15. The configuration of the key switches wherein the second key switch 15 is similar to the first key switch 15 only except for the thickness of the key top provides a lower cost for the lap-top computer because most of the parts are fabricated in common steps for both the key switches.

In an alternative of the present embodiment, the second key switch 15 may have a key top having a thickness equal to the thickness of the key top 24 of the first key switch 16 by using a configuration that the second key switch 15 has a smaller stroke "S" than the first key switch 16.

Further, although only a single row of the key switches 15 on each side of the key board 12 has a lower top in the above embodiment, the bottom or top row of the key board 12 may also have a lower top, or two or more rows of the key switches may have a lower top instead. The first key switches may be preferably implemented as alphabetic key switches and/or numerical key switches. The second key switches 15 may be preferably implemented as other key switches such as functional key switches which are less frequently operated by the user.

Since the above embodiment is described only for an example, the present invention is not limited to the above embodiment and various modifications or alterations can be easily made therefrom by those skilled in the art without departing from the scope of the present invention.

What is claimed is:

1. A lap-top computer comprising:
   a computer body having thereon a key board including a plurality of key switches,
   a top cover coupled to said computer body with a hinge, said top cover including:
   a display unit, and
   a peripheral protrusion adjacent to said display unit,
   said plurality of key switches including first key switches disposed in a central area of said key board, and
   second key switches disposed in a peripheral area of said key board corresponding to at least a portion of said peripheral protrusion, each of said second key switches having a lower top than said first key switches when said first and second keys are in an un-depressed position.

2. The lap-top computer as defined in claim 1, wherein said first key switches include alphabetic key switches and/or numeric key switches, and said second key switches include other switches.

3. The lap-top computer as defined in claim 1, wherein said key board has a key cylinder for each of said key switches, each of said key switches has a piston slidably received in said key cylinder and a key top fixed to said piston.

4. The lap-top computer as defined in claim 3, wherein each of said second key switches has said key top having a smaller thickness than said key top of said first key switches.

5. The lap-top computer as defined in claim 3, wherein each of said second key switches has said piston having a smaller stroke than said piston of said first key switches.

* * * * *